Patented May 7, 1940

2,199,780

UNITED STATES PATENT OFFICE 2,199,780

IMIDAZOLINES CONTAINING SULPHURIC ACID RADICALS AND PROCESS OF PREPARING THEM

August Chwala, Vienna, and Edmund Waldmann, Klosterneuburg, Germany, assignors to I. G. Farbenindustrie Aktiengesellschaft, Frankfort-on-the-Main, Germany No Drawing. Application May 4, 1939, Serial No. 271,716. In Austria August 10, 1934

5 Claims. (Cl. 260—309)

The present application is a continuation-in-part of our co-pending application Serial No. 74,782 filed April 16, 1936.

This invention relates to imidazolines or their derivatives, of high molecular weight, and containing sulphuric acid residues, the products representing valuable wetting agents, washing agents, emulsifiers, levelling agents, and the like, and to a process of preparing them.

An object of the invention is a process of preparing imidazolines containing sulphuric acid residues by condensing imidazolines substituted in 2-position by aliphatic or cycloaliphatic radicals of high molecular weight, and containing at least 10 carbon atoms in the molecule with aliphatic or aralphatic halogen sulphonates.

As aliphatic or aralphatic halogen sulphonates there may, for instance, be named the salts of the bromethano-sulphonic acid and of the para-benzylchloride sulphonic acid.

The imidazolines to be used are substituted in 2-position by aliphatic or cycloaliphatic hydrocarbon radicals of high molecular weight which may contain hydroxyl groups. There may, for instance, be used imidazolines which contain a residue with 7 or more carbon atoms in 2-position and which are derived from ethylene-diamines and aliphatic or cycloaliphatic carboxylic acids, for instance lauric acid, palmitic acid, stearic acid, oleic acid, ricinoleic acid or naphthenic acids.

The compounds obtained by the process above described dissolve in water to more or less colloidal solutions which foam strongly, have good wetting, washing, dispersing and levelling properties, are stable to the compounds which give rise to hardness in water, exert excellent protective action against the precipitating out of lime soaps in soaping processes conducted in hard water, possess remarkable emulsifying and dispersing power and are, therefore, suitable as adjuvants in the textile industry and in similar fields.

The following examples serve to illustrate the invention, but they are not intended to limit it thereto:

1. 22.4 grams of 2-undecyl-$\Delta^2$-imidazoline are dissolved with 22 grams of sodium bromethano-sulphonate in about 200 grams of absolute alcohol and the solution is heated to boiling for about 80 hours in a reflux apparatus. A solution of 4 grams of sodium hydroxide is then added and the whole is evaporated to dryness. The yield of crude imidazoline sulphonate which still contains 22 per cent. of sodium bromide amounts to about 45 grams.

The substance obtained is a whitish mass which with the addition of water readily passes over into a clear, foaming solution which is unaffected by the hardening principles in water and which possesses good wetting and cleansing properties.

2. 153 parts of heptadecenylimidazoline are heated with 90 parts of sodium bromethano-sulphonate to about 160° C.–170° C. until a test sample obtained after the neutralization dissolves in water.

There is obtained a strongly foaming, brownish mass which dissolves in water to a colloidal solution and which may serve as an adjuvant in the textile industry. It still contains a small quantity of cation-active heptadecenylimidazoline.

3. 31 parts of heptadecylimidazoline are heated with 46 parts of sodium para-benzylchloride-sulphonate (of about 50 per cent. strength) to about 180° C.–200° C. until a test sample has dissolved in dilute sodium carbonate solution.

After the solution has been mixed with sodium carbonate a brownish mass is obtained which in water possesses a good wetting, foaming and dispersing power.

Various processes are already known for the preparation of benzimidazoles containing sulphuric acid residues. These compounds have always been obtained by a direct sulphonation of benzimidazoles. During this operation the sulpho group enters into the benzene ring of the benzimidazole or into an aromatic ring present as a substituent or into both. It is not possible to condense benzimidazoles containing an unsubstituted imino group with a halogen-alkyl sulphonic acid or halogen-aralkyl sulphonic acid.

By heating 2-pentadecyl-benzimidazole with sodium brom-ethano-sulphonate in absolute alcohol for 80 hours to boiling or for several hours with application of pressure to 120° C., there can be ascertained that no bromine ions have been formed, i. e., that no condensation with evolution of hydrogen bromide has occurred. By heating the components with addition of anhydrous finely pulverized sodium carbonate for several hours in alcohol to 170° C. a reaction occurs, but reaction products which are soluble in water to a clear solution are not obtained. Benzimidazoles substituted in the imino group by the ethane-sulphonic acid residue can, therefore, not be obtained by the reaction with bromethano-sulphonic acid. The same results are obtained by carrying out the reaction in the absence of alcohol, merely by directly heating the components.

But the reaction of imidazolines of high molecular weight with a halogen alkyl-sulphonic acid or halogen aralkyl sulphonic acid does not show any difficulties but by a ready reaction products are obtained which are soluble in water to a clear solution.

We claim:

1. The process which comprises causing imidazolines substituted in 2-position by a radical having at least 7 carbon atoms selected from the group consisting of aliphatic and cycloaliphatic hydrocarbon radicals and aliphatic hydrocarbon radicals containing hydroxy groups to react with a member of the group consisting of halogen alkyl and halogen aralkyl sulphonic acids.

2. The process which comprises causing 2-undecylimidazoline to react with bromethanosulphonic acid.

3. The process which comprises causing 2-heptadecylimidazoline to react with para-benzylchloride sulphonic acid.

4. The product having the formula:

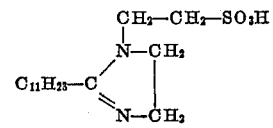

5. The products having the formula:

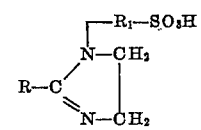

wherein R is an alkyl radical having at least eleven carbon atoms and $R_1$ is an alkylene radical of lower molecular weight.

AUGUST CHWALA.
EDMUND WALDMANN.